United States Patent [19]

Laprade

[11] Patent Number: 4,839,847

[45] Date of Patent: Jun. 13, 1989

[54] N-CLOCK, N-BIT-SERIAL MULTIPLIER

[75] Inventor: Kenneth C. Laprade, Palm Bay, Fla.

[73] Assignee: Harris Corp., Melbourne, Fla.

[21] Appl. No.: 38,329

[22] Filed: Apr. 14, 1987

[51] Int. Cl.$^4$ .............................................. G06F 7/52
[52] U.S. Cl. .................................... 364/754; 364/757
[58] Field of Search .............................. 364/754–760, 364/768, 784, 786, 724

[56] References Cited

U.S. PATENT DOCUMENTS

| | | | |
|---|---|---|---|
| 3,508,038 | 4/1970 | Goldschmidt et al. | 364/757 |
| 3,993,890 | 11/1976 | Peled et al. | 364/724 |
| 4,679,164 | 7/1987 | Rearick | 364/754 |
| 4,706,211 | 11/1987 | Yamazaki et al. | 364/757 |

Primary Examiner—Gary V. Harkcom
Assistant Examiner—Long Thang Nguyen
Attorney, Agent, or Firm—Antonelli, Terry & Wands

[57] ABSTRACT

A bit-serial multiplier has a multi-stage input data register and a multi-tiered tree of multiplexer/adder circuits coupled thereto which produces, at the output of the adder at the top tier of the tree, successive bit serial digital output codes representative of the products of a prescribed digital data code and successive input data codes as the input data codes are sequentially shifted into and through the input data register. By multiplexing the inputs to the adders of the tree to execute either an add function or to bypass data to the output successive output products codes can be generated at a twice the rate required to shift respective input codes into and through the input data register, thereby increasing the effective computational speed of the multiplier. The multiplexing/addition function of each multiplexer/adder involves controllably coupling the contents of selected stages of the input data register to selected adders of the adder tree and intercoupling selected ones of the adders between successive tiers of the adder tree, while effectively bypassing selected others of the adders between successive tiers of the adder tree, for each computational cycle of the adder tree, as the input data code is shifted therethrough. During the clocking of each input data code through the data register, the controllably coupling, intercoupling and bypassing of the adders of the tree is carried out in dependence upon the location of the code within the stages of the data register.

20 Claims, 8 Drawing Sheets

N-CLOCK, N-BIT-SERIAL MULTIPLIER

FIELD OF THE INVENTION

The present invention relates in general to digital processing systems and is particularly directed to an improved N-bit bit serial multiplier.

BACKGROUND OF THE INVENTION

A commonly employed encoding technique in present day digital data processing systems is two's-complement notation. For positive numbers the binary representation is unaffected. For negative numbers, however, a translation or conversion is required which involves inverting all bits of the number and then adding a one to the least significant bit value to obtain the two's-complement notation.

In order to carry out arithmetic operations on such digitally encoded data, signal processing systems may manipulate the data in a parallel or serial fashion. Parallel processing requires the data to be encoded into a fixed word length, with all of the data bits being processed simultaneously. Serial processing, on the other hand, which processes data one bit at a time, does not require structuring of the data into a fixed word length. In a bit-serial data processing system, a data word (of any length) enters a bit-serial operator one bit per clock cycle, least significant bit first. The bit-serial operator (e.g. multiplier) calculates an output bit based upon the input bit and information derived and stored from previous bit serial operations (such as a carry in the case of add operation). The output data is produced serially, least significant bit first, synchronized with the system control clock through which the input data is applied to the operator. Because data is applied to the operator in a continuous, serial fashion, an external control signal is applied to the operator when a new word begins, so as to demarcate the end of one word and the beginning of the next. Typically, the bit-serial operator employs this notification signal to clear any internally stored registers.

Examples of mathematical operations that can be performed bit-serially include addition, subtraction and multiplication functions. Components which execute such functions can be connected with pipelined registers to evaluate mathematical equations. The maximum clock rate at which processing can be carried out depends upon the propagation delay of the bit serial components between pipelined registers. Also, the word throughput rate depends upon the number of bits in the word being processed.

As one example of a bit-serial operation, consider the equation $R$ (result)$=K1\ (A+B)-K2\ (C+D)$. In this equation, each of the letters A, B, C and D represents a respective multi-bit input data word, while K1 and K2 correspond to prescribed constants. Each data word A, B, C, D may be stored in a respective multi-bit shift register. The outputs of the shift registers storing data words A and B may be coupled serially to a first adder while the outputs of the shift registers storing data words C and D may be coupled serially to a second adder. The outputs of the adders are then coupled to respective multipliers to which the constants K1 and K2 are applied as additional inputs, with the outputs of the multipliers being applied to a subtraction circuit. The output of the subtraction circuit is coupled to an output shift register from which the result R is obtained.

For each clock cycle, one bit of each of the data words A, B, C and D is shifted out of its respective shift register through the arithmetic logic which executes the equation. After N clock cycles, a new word may be loaded into the respective shift registers from which data words A, B, C and D have been derived. In other words, the word rate is 1/N of the clock rate, where N corresponds to the number of bits per data word.

A commonly employed component in bit serial signal processing systems is the bit-serial adder, which adds two bit-serial data streams and produces a bit-serial data stream output corresponding to the sum of the input streams. Each sum bit is calculated as the sum of the two input bits and a carry from the addition of the previous bits. At the same time that the sum is being computed, the carry bit for the current input bits is also derived. The carry bit is latched by the input data clock for use during the addition of the next two input bits. When a new data word is to be processed, a control signal is applied to the carry latch to clear its current contents.

Using a combination of bit-serial adders, a bit-serial multiplier, which accepts a bit-serial data stream and outputs a bit-serial data stream composed of each input data word multiplied by a constant, may be implemented. The constant may be stored in a loadable register or hard-wired into the multiplier. Since an N-bit word multiplied by an N-bit constant yields a 2N-bit result, additional clock cycles are required to maintain a steady flow of data through the multiplier. Assuming that all numbers are treated as positive, then N zeroes can be inserted between input data words to equalize clock rates. If the input data words are in two's complement notation, and the constant is positive, then N-clocks of sign-extended data can be inserted between successive data words.

Figure 1:
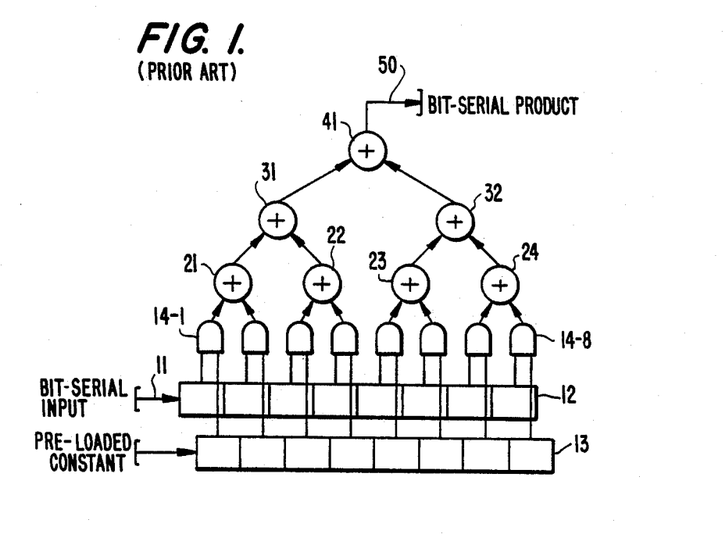
FIG. 1 is a schematic logic diagram of a conventional adder-tree configured bit-serial, constant multiplier.

An example of a bit-serial multiplier formed from a tree of bit-serial adders is illustrated in FIG. 1. As shown therein, an input bit serial data stream is applied over link 11 to a shift register 12 and successively shifted therethrough by a system clock signal CLK. In the exemplary adder tree shown in FIG. 1, shift register 12 has a capacity of eight bits and the adder tree is configured to multiply an eight bit constant stored in a separate shift register 13 by a data word (of any length) that is coupled over input link 11 and shifted through the respective stages of shift register 12. The constant by which the bit serial data word is to be multiplied is stored in register 13, the successive stages of which are coupled as inputs to a set of masking AND gates 14-1 . . . 14-8. Second inputs of masking gates 14-1 . . . 14-8 are derived from the contents of the respective stages of shift register 12.

The outputs of masking AND gates 14-1 . . . 14-8 are coupled in pairs to respective bit serial adders 21, 22, 23, 24 which form a first tier of the adder tree. Each of adders 21-24 of the first tier of the tree, as well as the adders of the other tiers of the tree is comprised of a full adder with a carry latch (flip-flop). The outputs of bit serial adders 21 and 22 are coupled as inputs to a bit serial adder 31 of a second tier of the tree, while the outputs of bit serial adders 23 and 24 are coupled as inputs to a bit serial adder 32 of a second tier of the tree. Finally, the outputs of bit serial adders 31 and 32 are coupled as inputs to bit serial adder 41 at the top tier of the tree, the output of which on link 50 represents the bit-serial product.

For successive clock cycles, successive bits of an input data word on link 11 are shifted into and through the shift register 12. Because of masking gates 14-1 . . . 14-8, any bit position of the constant that is loaded into the register 13 corresponding to a zero effectively masks the corresponding bit or bits of the shift register 12, preventing that respective data from entering the adder tree. Bits which are permitted to enter the adder tree are summed together producing a product on link 50 at the top of the tree.

Figure 2:
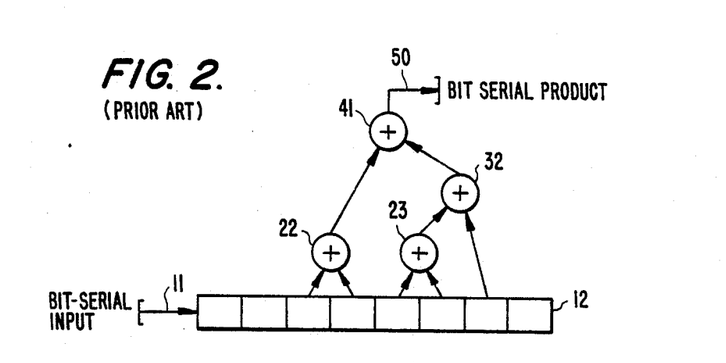
FIG. 2 is a schematic logic diagram of a hard-wired conventional adder-tree configured bit-serial multiplier for multiplying a bit-serial binary data word by the constant $01111100_2$.

For applications involving the use of a known and fixed constant, rather than employ a separate constant register 13 and masking gates 14, the hardware complexity of the adder tree configuration shown in FIG. 1 can be simplified by including only those adders which would receive unmasked data from stages of the input data shift register 12 and directly connecting those shift register stages to corresponding adders. An example of 8-bit multiplier which is hard-wired to multiply an input data stream by the constant $01111100_2$ is shown in FIG. 2. As can be seen therein, the configuration shown in FIG. 1 has been considerably simplified, requiring only adders 22, 23, 32 and 41 of the adder tree, no masking gates and no separate constant register. Because of this ability to simplify the hardware configuration of a bit-serial adder tree, such components are particularly attractive for present day, high densified and complex integrated signal processors.

In a pipelined bit-serial signal processing system, for every N-bits input to a signal processing operator, there must be serialized out N-bits of processed data in order to avoid the necessity of rate buffering. If only the N-most significant bits of a multiplication are required, then only half of the 2N clock cycles required to shift a 2N-bit data word through the N-bit shift register of the multiplier are necessary. However, after the first N clocks have shifted the required result out of the multiplier, the pipeline and shift registers still contain information relating to the current multiplication. Even if a clear signal is supplied to the multiplier to purge that information and clear the multiplier for new data, several clock cycles are required to refill the pipeline, which constitutes an undesirable and, in highly pipelined environments such as referenced above, sometimes unacceptable signal processing delay.

SUMMARY OF THE INVENTION

In accordance with the present invention, the signal processing speed limitations of a conventional adder tree-configured bit-serial multiplier are significantly reduced (speed is effectively doubled) by an improved adder tree arrangement in which the operations of the individual adders of the tree are multiplexed, so as to permit immediate processing of a new data word after only N clock cycles. The multiplexing function is implemented by configuring each bit serial adder as a multiplexer-adder, one data path through which encounters the normal carry-save adder employed in a conventional adder tree arrangement, and the other data path of which is controllably passed directly through the multiplexer-adder as an input to a multiplexer-adder higher tier. The use of a multiplexer-adder circuit is based upon the observation that the addition function carried out by each adder of the tree is effectively employed for only N clock cycles. During the remaining N clock cycles, the adders are essentially adding two copies of the extended sign bit, which always produces a result of zero or one (for a negative number) on the output data stream. As a result, by controllably multiplexing the branch paths from the input data register through the multiplexer-adder tree, data can be directly passed through the adder stages during appropriate clock cycles, leaving the adder circuitry therein available for processing data for the succeeding data word.

In accordance with a preferred embodiment of the invention, in place of the conventional bit-serial adder, a multiplexed pass through/adder circuit is incorporated into the respective tiers of the adder tree. Each multiplexed-adder has four inputs and two outputs. The four inputs are divided in pairs, with each pair being derived either from the two outputs of an adder of a lower tier or from the same respective one of the stages of the data register (depending upon the binary value of the constant).

The multiplexer-adders of each tier of the adder tree, except for the lowest tier, operate in one of two modes. In accordance with a first mode, a data bit from one input of each pair of inputs is coupled to the carry/save adder and an output bit representative of the addition is applied over a first output link (e.g. as one input to a multiplexer-adder of a higher tier). A selected one of the remaining two inputs is coupled directly to the second output of multiplexer-adder. In the second mode of operation, the inputs which were not coupled to the adder circuit during the first mode are supplied thereto and the sum output is applied to the second output of the multiplexer-adder (e.g. as one input to the second input of a multiplexer-adder of a higher tier). The first output of the multiplexer-adder is directly coupled to one of the inputs which had been applied to the adder circuit during the first mode.

The multiplexer-adders which make up the lowest tier of the adder tree have first and second inputs coupled to respective adjacent stages of the data register. Like the multiplexer-adders of the other tiers of the tree, those of the lowest tier have two outputs, coupled to respective inputs of an adder of a higher tier. The multiplexer-adders of the lowest tier, however, have an additional input coupled to receive the sign bit (corresponding to the most significant bit) of the immediately preceeding data word, as the lowest significant bit of a new data word is clocked into the first stage of the shift register. The multiplexing/adding function of each multiplexer-adder of the lowest tier controllably carries out a carry save bit serial addition in the same manner as the adders of the other tiers of the tree. Through a prescribed mode control signal, each multiplexer-adder of the lowest tier adds respective inputs from two adjacent stages of the data register and supplies a sum output over one of its two outputs. It also selectively couples either a zero, the sign bit, or the contents of one of the stages to which one of its inputs is connected over one of its outputs. To provide for the extended sign bit, the multiplexer also feeds the sign bit into the adder to be summed with the contents of a respective stage of the data register.

The adder at the highest tier of the adder tree produces a bit serial output corresponding to the N most significant bits of the result of multiplying the input data word by a prescribed constant represented by the adder tree configuration and the connection of the inputs of the adders of the tree to selected stages of the data register, such as shown in FIG. 2, referenced previously.

Because of the multiplexing capability of each multiplexer-adder stage for each tier of the adder tree, what would otherwise constitute dead time or repetitive sign bit extension normally carried out by the adder function, is, instead, circumvented by a controlled pass-through, bypassing the adder circuitry and permitting the adder circuitry to be used for processing the bits of a succeeding data word, rather than calculate the lowest N significant bits of the product, which are effectively unused.

DETAILED DESCRIPTION

Before describing, in detail, the particular improved bit serial constant multiplier in accordance with the present invention, it should be observed that the invention resides primarily in a novel structural combination of conventional signal processing circuits and not in a particular detailed configurations thereof. Accordingly, the structure, control and arrangement of these conventional circuits have been illustrated in the Drawings by readily understandable block representations and schematic logic diagrams, which show only those specific details that are pertinent to the present invention, so as not to obscure the disclosure with structural details which will be readily apparent to those skilled in the art having the benefit of the description herein. Thus, the schematic logic illustrations of the Figures do not necessarily represent the mechanical structural arrangement of the exemplary system, but are primarily intended to illustrate the majoral structural components of the system in a convenient functional grouping, whereby the present invention can be more readily understood.

In order to facilitate an appreciation of the controlled multiplexing/addition function carried out in accordance with the improved adder tree bit serial multiplier of the present invention, it is initially useful to examine the behavior or sequential operational states of the components of a conventional adder tree-configured bit serial multiplier as its multiplies a prescribed constant by a binary data value of some prescribed length. For this purpose, consider the product of a positive constant $01111111_2$ ($255_{10}$) by the positive number $01111111_2$ ($127_{10}$). An adder tree hardwired to multiply the above constant by any binary data word value is illustrated diagrammatically in FIG. 3. As shown therein, the adder tree is hardwired in the manner similar to the configuration shown in FIG. 2; namely, eight successive stages 12-1 ... 12-8 of data register 12 are coupled, in pairs, as inputs to a first tier of adders: adder-1, adder-3, adder-5 and adder-7. The sum outputs of adders 1 and 3 are coupled to adder 2 while the sum outputs of adders 5 and 7 are coupled to adder 6, adders 2 and 6 making up the second tier of the tree. Finally, the third tier of the tree is comprised of a single adder, adder 4, which receives the outputs of adders 2 and 6 and provides a bit serial product output.

Figure 4:
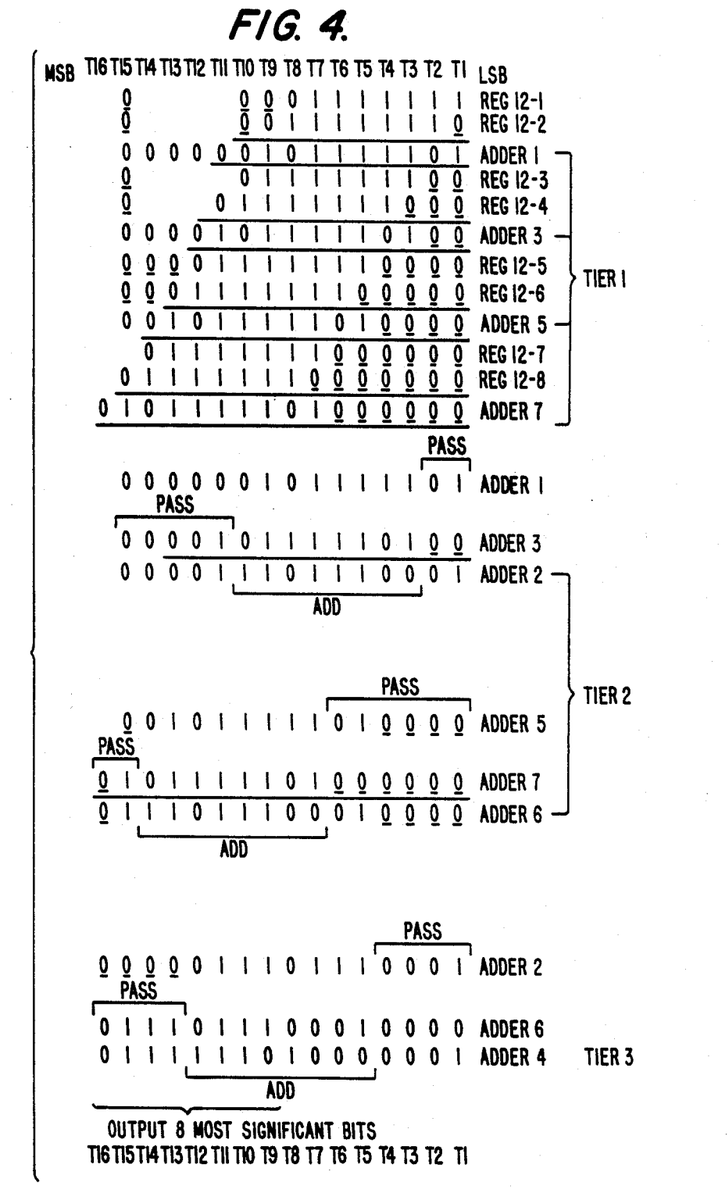
FIG. 4 is a diagrammatic illustration of the respective states of the components of the multiplier of FIG. 3 in the course of its operating on the input data word $01111111_2$.

As mentioned previously, the length of time required to multiply two bit-serial binary numbers by one another is equal to the sum of the lengths of the respective numbers. Thus, for two eight bit numbers, sixteen clocks cycles are required to obtain the product. The operation of the components of the adder over these successive sixteen clock cycles with the two numbers in the example presently under consideration is shown in FIG. 4. For the purposes of the present example, it will be assumed that the data register 12 is initially cleared or reset. The respective states of the register stages 12-1 ... 12-8 together with the outputs of the adders: adder-1, adder-3, adder-5 and adder-7, which make-up tier 1 are shown in the upper portion of FIG. 4. As can be seen therein, the contents of the respective stages 12-1 ... 12-8 of data register 12 are offset or delayed from one another by successive clock cycles as one proceeds from the least significant bit stage 12-1 through the most significant bit stage 12-8 of the register. Namely, the output of register stage 12-2 follows, but is delayed by one clock cycle with respect to, the output of register stage 12-1. Proceeding through the data register, the contents of register stage 12-8 ar delayed with respect to the contents of register stage 12-1 by seven clock cycles.

Looking now at the operation of each of the individual adders, each of the adders of tier 1 is comprised of a full adder and carries out a full binary addition of the contents of the respective stages of the data register to which its inputs are connected. Thus, adder number 1 produces an output representative of the sum of the contents of register stages 12-1 and 12-2. Since, in accordance with the present example, the numbers being multiplied are positive numbers, the output of adder 1 has an extended sign bit as a 0, shown as the sum of extended 0s on the inputs.

Proceeding down the respective stages of the data register, since the contents of the successive stages are successively delayed with respect to one another, the outputs of adders 3, 5 and 7 effectively follow the output of adder 1, but are delayed by the effective delay of the clocking of the signals through the respective data register stages to which their inputs are connected. Thus, the output of adder 3 is identical to the output of adder 1 but is delayed by two clock cycles, corresponding to the two clock cycles between the input of the data register on link 11 and stages 12-1 and 12-2 through which the data word must pass before it encounters data register 12-3, the first input to adder 3.

Similarly, the output of adder 5 is delayed with respect to adder 3 by two clock cycles and is delayed with respect to adder 1 by four clock cycles. Finally, the output of adder 7 is delayed with respect to adder 1 by the six clock cycles required to clock the input data stream from the input link 11 through data register stages 12-1 ... 12-6.

At that portion of FIG. 4 adjacent the identifier tier 2, the operation of the adders of the second tier of the tree (namely adders 2 and 6) is tabulated. An examination of the operation of adders 2 and 6 reveals that the full adder operator (including carry) of each adder is required only during one-half of the clock cycles that the data stream is being clocked through the register and applied to each adder. More specifically, adder 2 effectively carries out a full add operation only during clock cycles T3–T10. During the initial two clock cycles T1 and T2, adder 3 has not yet encountered any data input, so that the output of adder 2 is effectively what is being provided by adder 1. This operation is identified in FIG. 4 as a "PASS" heading above the output of adder 1 for clock cycles T1 and T2. Similarly, for clock cycles T11 and T12, the output of adder 1 has been completed and its output is simply an extension of the sign bit (0 for a positive number). At this time, accordingly, the output of adder 2 is passing through the contents of adder 3, again identified by the heading "PASS" during clock cycles T11 and T13–T16.

An examination of the operation of adder 6, which receives inputs from adders 5 and 7, is substantially identical to the operation described above with respect to adder 2, except that, as mentioned previously, adder 6 is delayed by four clock cycles relative to the operation of adder 2. Thus, the full add (including carry) function of adder 6 is required only during clock cycles T7 through T14. During clock cycles T1 through T6 the output of adder 6 effectively maps the output of adder 5, while during clock cycles T15 and T16, the output of adder 6 effectively corresponds to the output of adder 7.

The state of operation of adder number 4, which constitutes the third tier of the tree, is shown in the lower portion of FIG. 4. Again, as is the case of adders 2 and 6, adder 4 carries out an addition operation only for half the clock cycles required to execute the full multiplication. During clock cycles T1–T4, the output of adder 4 corresponds effectively to a passing through of the output of adder 2; similarly, during clock cycles T13–T16, the output of adder 4 effectively corresponds to a passing through of the output of adder 6. The full add operation of adder number 4 is required only during clock cycles T5–T12.

In accordance with the present invention, advantage is taken of this effective non use of the adder functions of the respective tiers of the adder tree to process (multiply) additional data and thereby increase the throughput/speed of the multiplier. In particular, for a pipelined operation, when multiplying an N bit word by an M bit constant, the output word must be N bits in length, where $N \geq M$.

Figure 5:
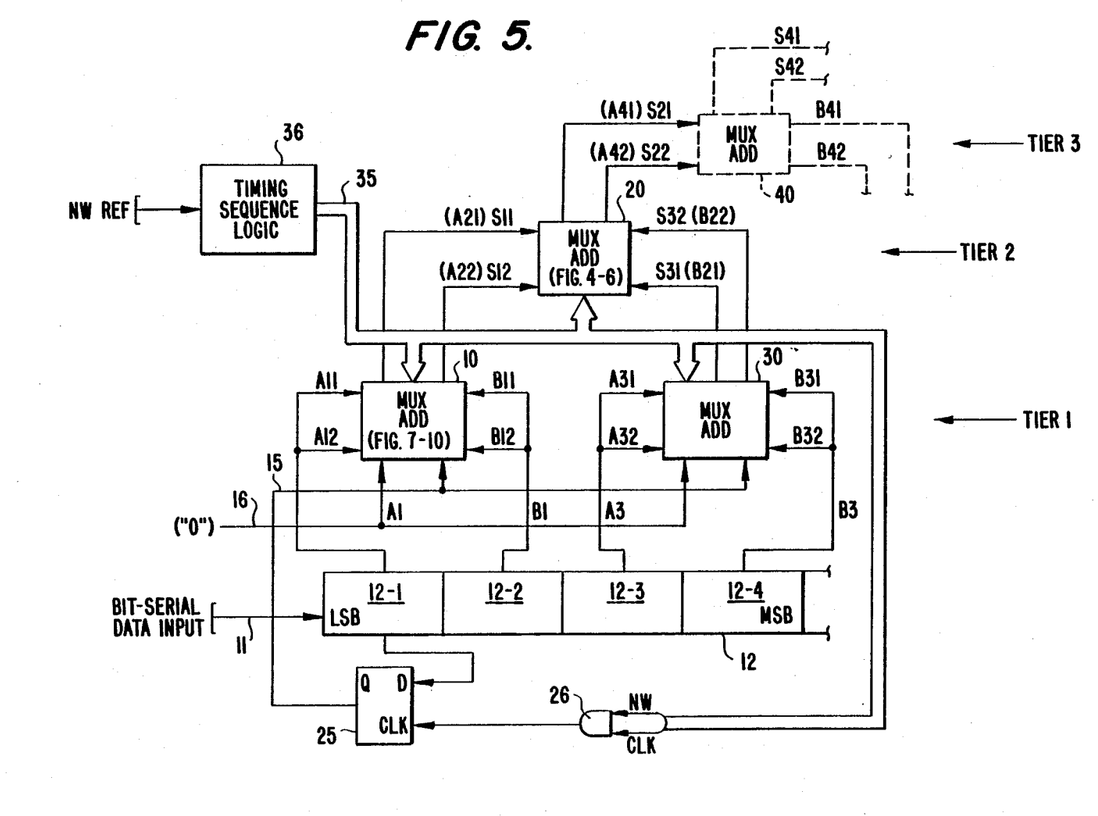
FIG. 5 is a schematic logic diagram of a multiplexer-adder-configured bit serial constant multiplier in accordance with the present invention.

Referring now to FIG. 5, there is illustrated a schematic logic diagram of an adder-tree configured bit serial constant multiplier in accordance with the present invention, in which the respective stages of the tree comprise multiplexer-adder circuits in place of the conventional adder circuits described above with reference to FIGS. 1 and 2. As shown in FIG. 5, bit serial data on input link 11 is coupled to a data register 12. The length of data register 12 corresponds to the length of the binary data word to be employed as a constant positive multiplier. To simplify the drawing and the explanation of the mathematical operation of the multiplier, data register 12 has been shown as comprising only four stages 12-1 (corresponding to the least significant bit stage) ... 12-4 (corresponding to the most significant bit stage). It will be assumed here that the constant to be multiplied by input data is the positive number 01111, corresponding to the decimal number 15. Because the fifth bit and all higher bit positions of the number are represented by binary zeroes, there is no need to include a data register stage or associated adders for carrying out the multiplication for those (zero) bits. Accordingly, such stages have not been shown in the drawing. It will be realized, of course, that the present invention is not limited to only four bits or to any number of bits; the number four has been chosen only to simplify both the drawing and the description to follow.

The output of each stage 12-i of register 12 is coupled to a pair of inputs of multiplexer-adder circuits of which a first tier (TIER 1) of the adder tree is formed. Thus, the bit content of register stage 12-1 is coupled to inputs A1, A2 shown at the left-hand side of multiplexed-adder 10. The bit content of register stage 12-2 is coupled to the respective B1, B2 inputs shown at the right-hand side of multiplexer-adder circuit 10. The bit content of register stage 12-3 is coupled to the A31, A32 inputs at the left-hand side of multiplexer adder stage 30 while the bit content of data register stage 12-4 is coupled to the B31, B32 inputs at the right-hand side of multiplexer adder 30. Also coupled as additional inputs to the multiplexer adders of the first tier are a link 15 and a link 16. Link 15 is coupled to a flip-flop 25 which is coupled to store the contents of register stage 12-1 when the first bit of a new word is entered into the least significant bit stage 12-1 of register 12. Since data words are clocked into the register, least significant bit first, the value of the most significant bit of the immediately previous data word is latched by flip-flop 25 under the control of timing sequence logic 36. Link 16 is coupled to receive a "0" logic level.

As pointed out previously, each multiplexer-adder stage has a pair of outputs to be coupled to the respective input pairs of an adder of a higher (e.g. the next highest) tier. In the configuration shown in FIG. 5, multiplexer adder 10 has a pair of outputs S11, S21 coupled to the respective A21, A22 inputs of multiplexer adder 20 of TIER 2. Similarly, multiplexer/adder 30 has a pair of outputs S31, S32 coupled to the B31, B32 inputs at the right-hand side of multiplexer adder 20. Multiplexer adder 20 has a pair of outputs S21, S22. For a larger sized adder tree, outputs S21, S22 would be supplied to the A41, A42 inputs of a multiplexer adder 40 of a higher tier (next highest TIER 3 shown in broken line form in FIG. 5). As noted above, to simplify the illustration of the invention, the present description will be confined to an adder tree configured of only two tiers.

For controlling the operation of each of multiplexer-adders 10, 20 and 30, control signals are coupled over a link 35 from a timing sequence logic circuit 36. Timing sequence logic circuit 36 is coupled to receive a new word reference signal $NW_{REF}$ on input link 37 from upstream data transfer circuitry at the beginning of each new data word that is applied in bit serial fashion over link 11 to shift register 12. Logic circuit 36 is comprised of sequential and combinational logic and is driven by the system clock to produce, on bus 35, clock, mode control and new word signals, for controlling the multiplexing/addition functions of the respective multiplexer-adder circuits of the respective tiers of the adder tree. A unique new word signal $NW_i$ for each individual multiplexer-adder is generated by timing sequence logic 36 to inform that respective multiplexer-adder of the effective beginning of a new data word for that particular adder. In the hierarchy of the multiplexer-adder tree the new word signal for each multiplexer-adder is referenced to the new word reference input to timing sequence logic circuit 36 and is delayed therefrom by an integral number of clock pulses defined in accordance with the hierarchical position of the multiplexer-adder in the tree. Specifically, a respective one of the multiplexer-adders of the tree (denoted here as some multiplexer-adder i) receives over bus 35 a new word signal $NW_i$ equal to $(NW_{REF}+(i-1)T)$ where T is one clock cycle. Thus, for example, the new word $NW_3$ for multiplexer adder 30 occurs two clock cycles after the new word reference input $NW_{REF}$ to timing sequence logic 36.

A mode signal is applied to each multiplexer-adder to control the signal coupling operation of the multiplexer to or bypassing the adder function. For this purpose three mode signals designated as mode=0, mode-1 and mode=2 are employed. The functionality of these respective modes is defined in Table I, infra, and will be detailed in conjunction with the description of operation of the invention for a exemplary sequence of data inputs to shift register 12.

For each tier of the multiplexer-adder tree, timing sequence logic circuit generates respective mode signals as follows. For the lowest tier (Tier 1), a respective multiplexer-adder receives a mode 2 signal upon the occurrence of a new word $NW_i$ signal. Thereafter, the mode changes to mode 1 and remains at mode 1 until timing sequence logic 36 receives a new word input $NW_{REF}$. Upon the occurrence of a new word $NW_{REF}$ signal input to timing sequence logic circuit 36, the mode switches to mode 0, if possible (namely, only if a new word signal $NW_i$ for that multiplexer-adder does not occur; otherwise, the mode is mode 2, as noted above).

For every other tier (TIER 2, TIER 3, . . . ) the multiplexer-adder operates pursuant to mode 0 upon the occurrence of a new word reference signal $NW_{REF}$ and remains in mode 0 until the clock cycle $(NW_i+1)$. Upon the clock cycle $(NW_i+1)$ the operation of the multiplexer-adder switches to mode 1 and remains in mode 1 until the occurrence of a new mode reference signal $NW_{REF}$, at which time it goes to mode 0, as described supra.

Also coupled to each multiplexer-adder circuit are a system clock signal and a new word signal. Lines for coupling these signals have not been shown in FIG. 5 in order to simplify the illustration. Details of these signals and their application to the respective components of the multiplexer-adder circuits will be explained below in conjunction with the description of FIGS. 6–12.

Figure 6:
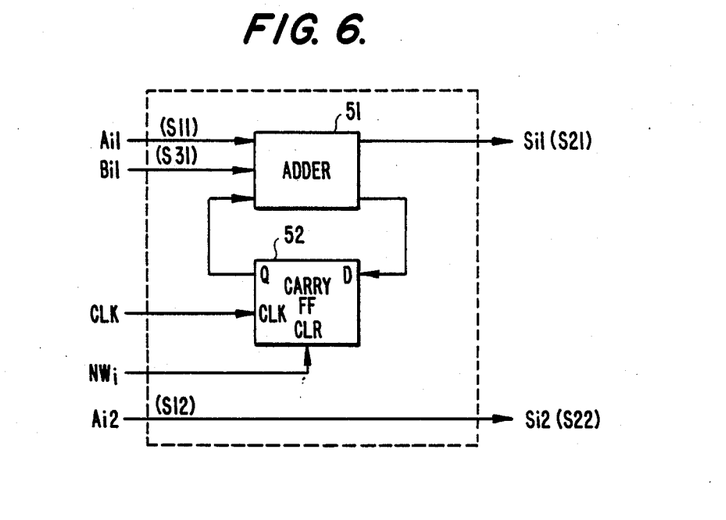
FIGS. 6 and 7 are logical function diagrams of the multiplex-adder operations carried out by multiplexer-adder stages of all but the lowest tier of the adder tree of FIG. 5.
Figure 7:
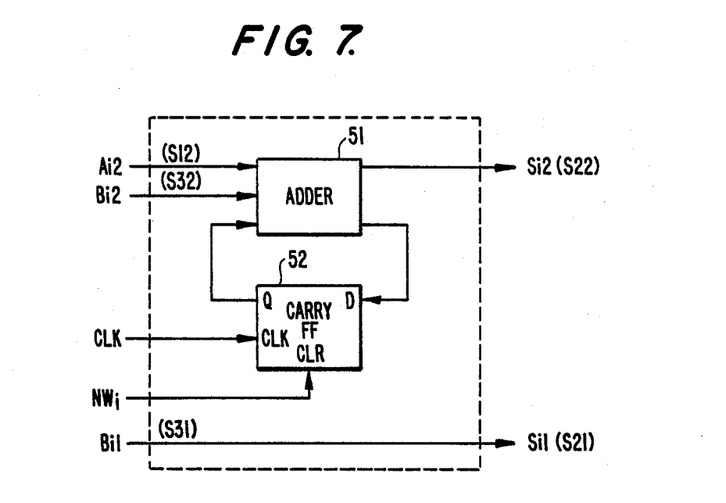

Referring now to FIGS. 6 and 7, the signal processing operation carried out by each multiplexer-adder of a tier of the tree other than TIER 1 for respective modes 0 an 1 are shown. FIG. 6 illustrates the effective internal circuitry configuration of a multiplexer-adder, such as multiplexer adder 20 of tier 2 of FIG. 5, for a first of two modes of operation. In this mode, termed mode 0, the Ai1 and Bi1 inputs to the multiplexer adder (corresponding here to outputs S11 and S31 of multiplexer adders 10 and 30 in TIER 1) are coupled to an adder 51, which produces the logical sum of the input bits Ai1 and Bi1 and supplies the resultant signal bit output over output link Si1 (corresponding to output link S21). The carry bit is saved in a carry flip-flop 52 and fed back as input to adder 51. Carry flip-flop 52 is cleared in response to a new word signal $NW_i$ and the carry bit is clocked into flip-flop 52 in response to the system clock CLK. The second output Si2 (corresponding to output S22 of multiplexer adder 20 of FIG. 5) is derived from input Ai2 (corresponding to output S12 from multiplexer adder 10 in TIER 1).

In the second mode of operation of multiplexer-adder 20 (corresponding to mode 1) shown in FIG. 7, inputs Ai2 and Bi2 (corresponding to outputs S12 and S32, respectively from adders 10 and 30 in TIER 1) are applied to adder 51. Output Si2 of the multiplexer adder corresponds to the summation output of adder 51. The other output Si1 of the multiplexer-adder is derived from the Bi1 input, corresponding to link S31 derived from multiplexer adder 30 in FIG. 5.

From an observation of FIGS. 6 and 7, it can be seen that multiplexer adder 20 combines the left-hand most inputs of input pairs Ai and Bi (inputs from adders 10 and 30) and supplies a summation output on link Si1 and couples the second Ai input (multiplexer adder 10) to its output Si2 during mode 0. During the second mode of operation (mode 1) the right-hand inputs (from multiplexer adders 10 and 30) on links Ai2 and Bi2 are summed in adder 51 and the sum bit is produced on link Si2. Output link Si1, which received the sum of inputs Ai1 and Bi1 in mode 0, is coupled directly to the Bi1 input.

Figure 8:
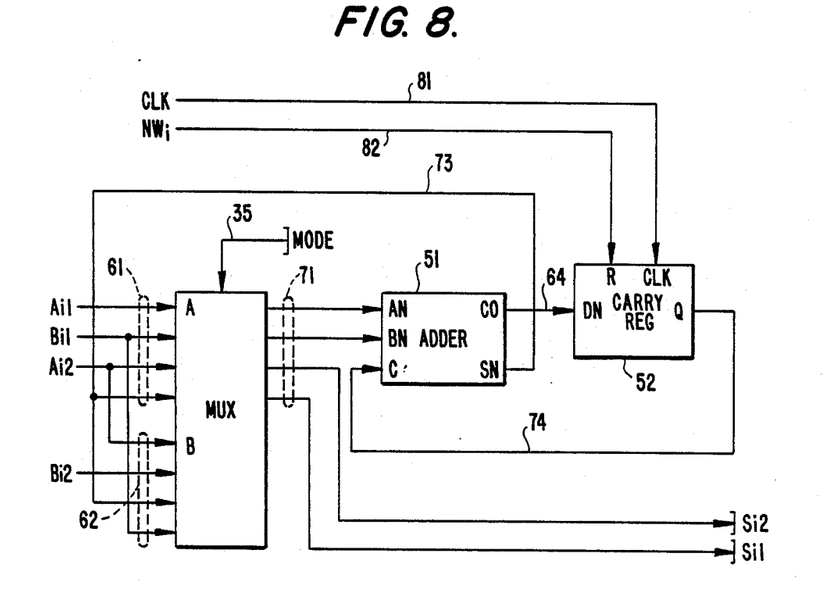
FIG. 8 is a schematic logic diagram of the multiplexer-adder for executing the multiplex/addition functions of FIGS. 6 and 7.

Referring now to FIG. 8 there is shown a detailed logic schematic of which the multiplexer-adder of each tier other than TIER 1 of the constant bit serial multiplier of the present invention is configured for implementing the functional operations described above with reference to FIGS. 6 and 7. As shown in FIG. 8, respective inputs Ai1 and Bi1 are coupled to a first multi (four) bit input link 61 which is coupled to a first input of a four bit 2:1 multiplexer 53. Input Bi1 is also coupled to a second four bit input link 62 of multiplexer 53. Link 61 is also coupled to receive input Ai2 and the summation input from the adder 51 supplied over link 73. That summation add bit is also coupled to link 62 which is further coupled to receive input bit Bi2. Signal flow control for multiplexer 53 is carried out by a mode control signal on link 35. For the 0 mode, the signal on link 35 will couple the four bits on input link 61 to output link 71. Two of the bits (the A and B bits) are coupled to the respective A and B inputs of adder 51. The other two bits are coupled to the Si1 and Si2 portions of output link 71. Namely, for mode 0, multiplexer 53 couples input link 61 to output link 71, so that inputs Ai1 and Bi1 are coupled to adder 51, the sum output of adder 51 (coupled over link 73) is coupled to output Si1, and input Ai2 is coupled to output Si2. For mode 1, input link 62 is coupled to output link 71 of multiplexer 53, so that adder 51 receives inputs Ai2 and Bi2, output link Si1 receives bit Bi1, and output link Si2 receives the sum output coupled over link 73 through the multiplexer and over output link 71.

The carry output of full adder 51 is coupled over link 64 to flip-flop 52, which receives clock and new word inputs on links 81 and 82, respectively. As pointed out previously, at the beginning of a new word (corresponding to the clocking of its least significant bit into the first stage 12-1 of register 12) a signal is supplied over link 82 to clear carry flip-flop 52. Thus, depending upon whether the multiplexer adder is operating in mode 0 or mode 1, opposite pairs of inputs Ai, Bi are summed in adder 51 and the sum is output on one of links Si1, Si2. The other link carries the opposite input bit Ai2 or Bi1, as shown in FIGS. 6 and 7. The manner in which the respective input/output links of the multiplexer-adder circuitry shown in FIG. 8 interact with the other components of the adder tree will be described below subsequent to the description of the configuration of the multiplexer adder circuitry for the lower most tier (TIER 1) of the adder tree.

Figure 9:
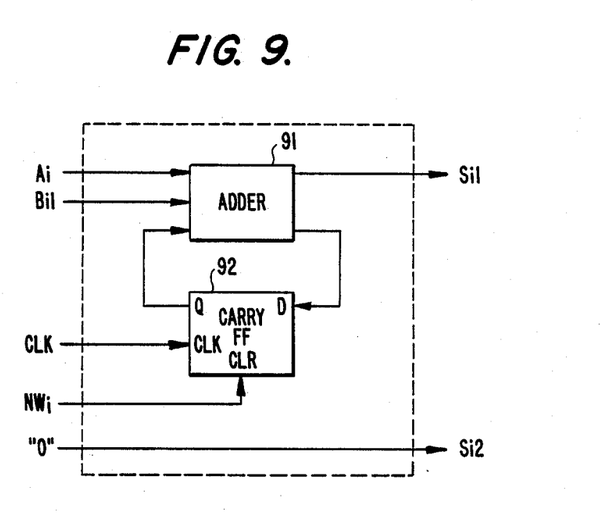
FIGS. 9, 10 and 11 are logical function diagrams of the multiplexer-adder employed for the respective stages of the lowest tier of the adder tree of the bit-serial constant multiplier shown in FIG. 5.
Figure 10:
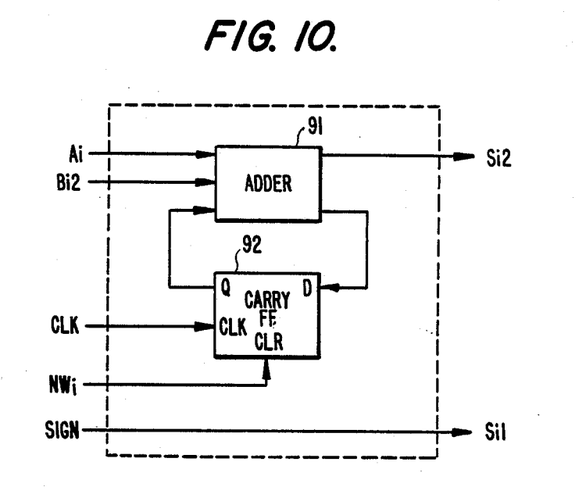
Figure 11:
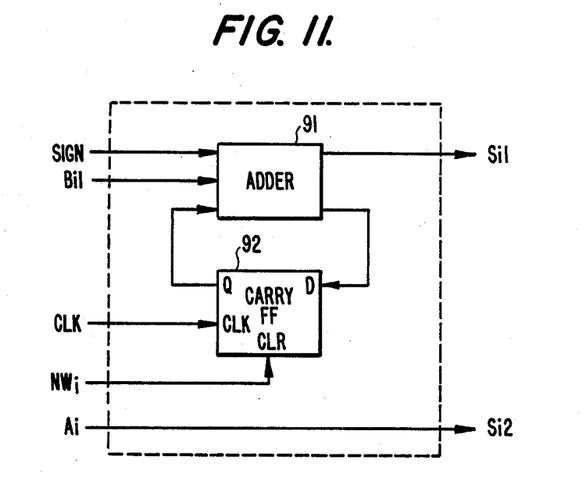

Referring now FIGS. 9-11, functionally illustrated are the multiplexer-adder circuit configuration for respective modes 0, 1 and 2 of each multiplexer-adder of which the first tier (TIER 1) of the tree is comprised. Like the multiplexer-adder circuitry for the other tiers, each multiplexer-adder includes a respective full adder 91 and carry flip-flop 92 coupled in a feedback path therewith. In addition, each multiplexer adder is coupled to receive a hardwired 0 input and the output of sign flip-flop 25, which stores the sign bit (MSB) of the immediately previous data word that has been processed by the adder tree.

A unique aspect of the signal coupling paths of the multiplexer-adders for the lowest tier of the adder tree is the fact that respective inputs of each pair of inputs o the left-hand and right-hand side of the multiplier adder are tied together to receive the output of the same stage of data register 12. As a result, the multiplexer circuitry can be simplified, requiring only single A and B inputs. (There still must be distinctive B1 and B2 inputs for use with higher order tiers where the lower "A" side tiers are deleted in the course of formation of a constant.)

The simplified circuitry is shown in FIGS. 9-11 as inputs Ai and Bi. For mode 0, the A and B inputs are coupled, together with the carry output of latch 92, to the inputs of full adder 91, the output of which is supplied over output link Si1. A hardwired "0" bit supplied over link 16 is coupled to output link Si2.

For mode 1, shown in FIG. 10, adder 91 again sums the inputs on links Ai and Bi, together with the carry bit supplied from carry flip-flop 92. The sum output, however, is supplied over output link Si2. The alternate output Si1 is derived from the sign input supplied over link 15 from flip-flop 25.

A third mode of operation (mode 2) of each multiplexer adder of the first tier of the tree is shown in FIG. 11. In this mode, the sign bit on link 15 and the Bi bit are summed in adder 91 together with the carry output from flip-flop 92. The summation output is supplied over link Si1. The other output link Si2 is directly connected to the Ai input.

Figure 12:
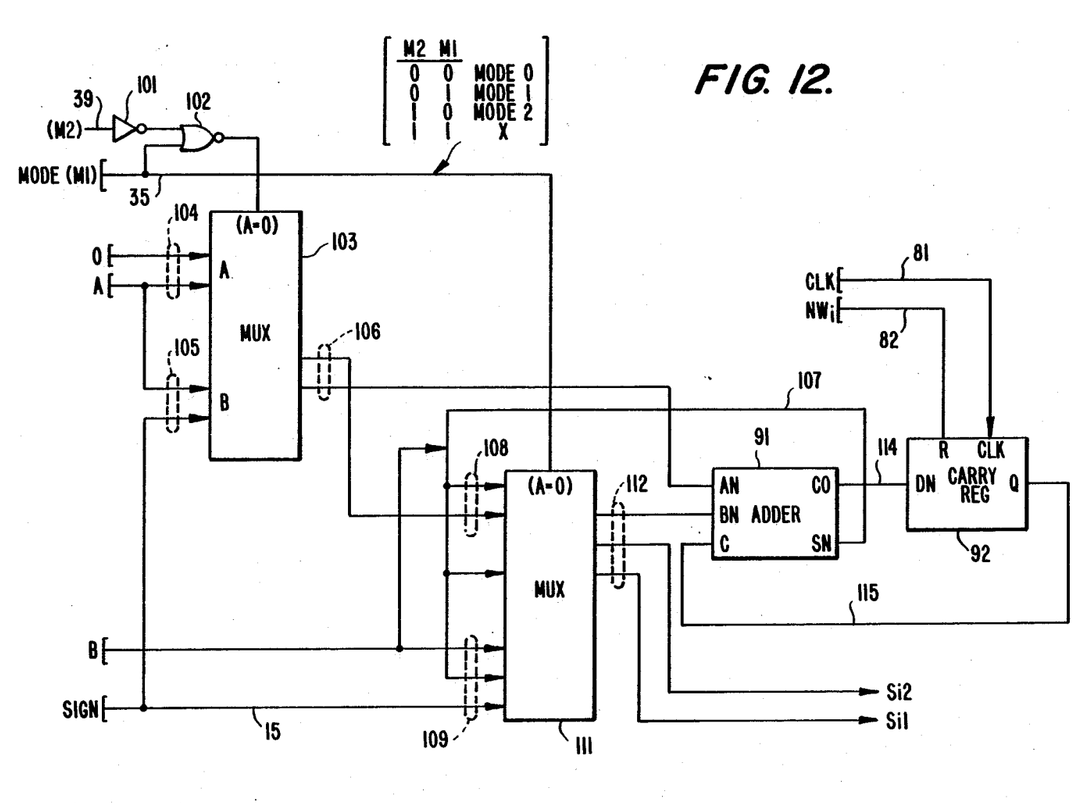
FIG. 12 is a schematic logic diagram of the configuration of the multiplexer-adder for each stage of the lowest level tier of the adder tree shown in FIG. 5 for implementing the multiplex/addition functions shown in FIGS. 9-11.

Referring now to FIG. 12, there is shown a detailed schematic logic diagram of the multiplexer-adder circuitry of which each multiplexer adder 10 and 30 of TIER 1 is comprised. As shown therein, each TIER 1 multiplexer-adder includes a full adder 91 the output of which is coupled over link 114 to an associated carry flip-flop 92 with the carry bit fed back over link 115 to the carry input of full adder 91. The respective inputs of full adder 91 are coupled over link 106 and 112 to the outputs of multiplexers 103 and 111, respectively. Multiplexer 103 has a first input coupled over link 104 to receive the A input from a prescribed stage of the register 12 and a hardwired "0" (ground) link 16. Multiplexer 103 is a two-bit, 2:1 multiplexer while multiplexer 111 is a three-bit, 2:1 multiplexer. The second input of multiplexer 103 is coupled over link 105 to the A input and to the sign input link 15. Control of the switching operation of multiplexer 103 is effected by a mode 2 signal supplied over link 39 through inverter 101 and NOR gate 102. A second input of NOR 102 is coupled from mode input signal line 35. Mode input signal line 35 also controls the signal coupling path operation of multiplexer 111.

Multiplexer 111 has a first input of 108 coupled to link 106 and to the B input. A second input link 109 of multiplexer 111 is coupled to the B input and to the sign link 115. One of the three bits which is coupled through multiplexer 111 is coupled as one input of full adder 91, while the other two bits on link 112 are coupled to outputs Si1 and Si2, respectively. As in the configuration shown in FIG. 6, links 81 and 82 couple clock (CLK) and new word (NW) signals for clocking the carry and resetting the contents of carry flip-flop 92.

In operation, for mode 0, a signal on input link 35 is coupled through NOR gate 102 to cause the input link 104 of multiplexer 103 to be coupled to output link 106. Also, input link 108 of multiplexer 111 is coupled to output link 112. As a result, the A input on link 104 is coupled over link 106 to one input of adder 91 while the B input on link 108 is coupled over link 112 to the second input of adder 91. Adder 91 thus provides a sum of the contents of bit links A and B, which is coupled back over link 107 and supplied through multiplexer 111 to the Si1 output link. The hardwired "0" on link 16 is coupled over link 104 through multiplexer 103 to input link 108 for application over output link Si2.

When the system is switched to mode 1 (shown in FIG. 10), the switching operation of multiplexer 103 remains unchanged. As a result, the A input on link 104 is coupled over link 106 as one input to full adder 91. The B input, which is coupled simultaneously to links 108 and 109, is coupled through multiplexer 111 from input link 109 to output link 112 to be applied to full adder 91 and summed with the A input on link 106. The summation output is coupled through link 109 to the output 112 and supplied over link Si2. The sign input, which is supplied over link 115 and applied to input link 109 of multiplexer 111, is coupled through multiplexer 111 to link 112 to the output Si1.

In mode 2 operation, a signal on link 39 is coupled through inverter 101 to change the output state of NOR gate 102, causing multiplexer 103 to switch output link 106 from input 104 to input 105. In this state, the sign bit on link 115 is coupled to output link 106 to one input of full adder 91, while the A input is coupled to link 108 of multiplexer 111. Since multiplexer 111 supplies a B input over link 112, adder 91 combines the sign bit on link 106 with the B bit on link 112 to produce a sign plus B total on output link Si1, as shown logically in FIG. 11. The A input on link 105 is coupled through multiplexer 111 to the Si2 output.

In order to facilitate an understanding of the overall operation multiplexer-adder tree configuration of the bit serial constant multiplier of the present invention, the description to follow will detail the operation of the system in the course of processing a series of positive and negative numbers. In order to appreciate the operational sequence through which the various components of the adder tree selectively add and bypass the binary bits on the inputs thereof, it is initially useful to set forth the definition of the mode of operation of the respective multiplexer-adders of which the system shown in FIG. 5 is configured. The operational definitions of the respective multiplexer-adders are listed in Table I below.

TABLE I

| MODE 0 | MODE 1 | MODE 2 |
|---|---|---|
| S11=A1+B1+C1 | S11=SIGN | S11=SIGN+B1+C1 |
| S12=0 | S12=A1+B1+C1 | S12=A1 |
| S31=A3+B3+C3 | S31=SIGN | S31=SIGN+B3+C3 |
| S32=0 | S32=A3+B3+C3 | S32=A3 |
| S21=S11+S31+C2 | S21=S31 | |
| S22=S12 | S22=S12+S32+C2 | |

As pointed out previously, in the exemplary configuration of the invention shown in FIG. 5, input data words are to multiplied by the positive constant 01111 (decimal 15).

Consider now the operation of the invention for a sequence of numbers D1, D2, D3, D4, each of which is represented here as a four bit number. Specifically, the description to follow will explain the operation of the invention for the sequence of numbers D1=0010 (decimal 2), D2=0111 (decimal 7), D3=1100 (decimal −4) and D4=0010 (decimal 2). As pointed out above, the multiplication of an N bit number by another N bit number yields a 2N bit number (here an eight bit number). As only the highest N (four) bits are to be resolved, the lower four bits of the product will be dropped. The upper four bits of the multiplication are obtained by the sequential offsetting in time of the product of an individual bit of the constant (1 or 0) by the input data word. The numbers D1 ... D4 listed above, may be represented by the data sequence 0010, 0111, 1100, 0010. It is noted, of course, that each of the numbers D1, D3 and D4 contains an unnecessarily extended sign bit. They are retained here simply for purposes of illustrating the processing of a four bit number in the tabulated sequence of Table II below.

multiplexer adder are modes 1 and 2, as shown. Mode number 2 is employed whenever a new word is encountered; namely, when the least significant bit of the new word of interest is clocked into the first stage 12-1 of shift register 12. Mode 2 is employed to insure proper extension of the sign bit for the previous data word. Note that the sign bit (the most significant bit of the previous word) and the carry bit are combined with the contents of register stage 12-2 which, upon clocking in the least significant bit of the next word into register stage 12-1, will contain the most significant bit of the previous word. Since the most significant bit of the previous word is the sign bit of that word, that sign bit must be extended throughout subsequent multiplication processing, as will be described below. Thus, whenever a new word is entered, the mode of operation of the initial multiplexer adder is mode 2. For all other bits of the input words being processed, the mode of operation is mode 1, which carries out an addition process and also extends the sign bit as necessary.

Figure 3:
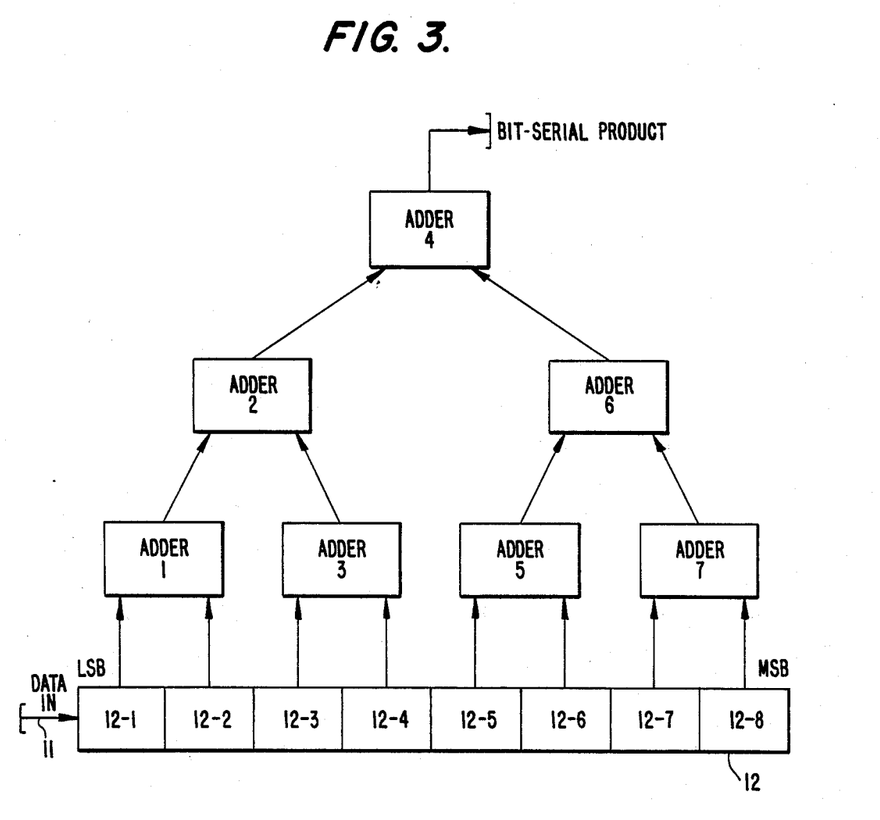
FIG. 3 is a diagrammatic illustration of an adder tree configured bit serial adder for multiplying a bit-serial binary data word by the constant $011111111_2$.

Each of the remaining multiplexer adders of the lowest tier (only one multiplexer adder 30 for the example presently described as shown in FIG. 3) operates in all three modes illustrated in FIGS. 9, 10 and 11. In effect, the successive multiplexer-adders of the first tier are offset from one another in terms of time of signal processing by two bits (corresponding to the two bits upstream) that are supplied to the immediately previous multiplexer-adder. Accordingly, multiplexer adder 30 is initially in mode 0. At time T3 its operation converts to mode 2 corresponding to that of the upstream multiplexer adder 10, described above. After operating in mode 2 for one cycle, multiplexer adder 30 reverts to mode 1. For words longer than four bits, the length of time during which the lower tiered multiplexer adders operate in mode 1 is extended by the number of additional bits. For example, for an eight bit word, multiplexer adders 10 and 30 would be in mode 1 for an additional four clock cycles.

TABLE II

| | T1 | T2 | T3 | T4 | T5 | T6 | T7 | T8 | T9 | T10 | T11 | T12 | T13 | T14 | T15 | T16 |
|---|---|---|---|---|---|---|---|---|---|---|---|---|---|---|---|---|
| MODE | 2 | 1 | 1 | 1 | 2 | 1 | 1 | 1 | 2 | 1 | 1 | 1 | 2 | 1 | 1 | 1 |
| A1 | 0 | 1 | 0 | 0⁻ | 1 | 1 | 1 | 0⁻ | 0 | 0 | 1 | 1⁻ | 0 | 1 | 0 | 0 |
| B1 | 0 | 0 | 1 | 0 | 0⁻ | 1 | 1 | 1 | 0⁻ | 0 | 0 | 1 | 1⁻ | 0 | 1 | 0 |
| S11 | 0 | 0 | 0 | 0 | 0 | 0 | 0 | 0 | 1 | 0 | 0 | 0 | 1 | 1 | 1 | 1 |
| S12 | 0 | 1 | 1 | 0 | 1 | 0 | 1 | 0 | 0 | 0 | 1 | 0 | 0 | 1 | 1 | 0 |
| C1 | 0 | 0 | 0 | 0 | 0 | 1 | 1 | 1 | 0 | 0 | 0 | 1 | 0 | 0 | 0 | 0 |
| MODE | 0 | 0 | 2 | 1 | 0 | 0 | 2 | 1 | 0 | 0 | 2 | 1 | 0 | 0 | 2 | 1 |
| A3 | 0 | 0 | 0 | 1 | 0 | 0⁻ | 1 | 1 | 1 | 0⁻ | 0 | 0 | 1 | 1⁻ | 0 | 1 |
| B3 | 0 | 0 | 0 | 0 | 1 | 0 | 0⁻ | 1 | 1 | 1 | 0⁻ | 0 | 1 | 1⁻ | 0 |
| S31 | 0 | 0 | 0 | 0 | 1 | 0 | 0 | 0 | 1 | 0 | 1 | 0 | 1 | 0 | 1 | 1 |
| S32 | 0 | 0 | 0 | 1 | 0 | 0 | 1 | 0 | 0 | 0 | 0 | 0 | 0 | 0 | 0 | 1 |
| C2 | 0 | 0 | 0 | 0 | 0 | 0 | 0 | 1 | 1 | 1 | 0 | 0 | 0 | 1 | 0 | 0 |
| MODE | 0 | 0 | 1 | 1 | 0 | 0 | 1 | 1 | 0 | 0 | 1 | 1 | 0 | 0 | 1 | 1 |
| S21 | 0 | 0 | 0 | 0 | 1 | 0 | 0 | 0 | 0 | 1 | 1 | 0 | 0 | 0 | 1 | 1 |
| S22 | 0 | 1 | 1 | 1 | 1 | 0 | 0 | 1 | 0 | 0 | 1 | 0 | 0 | 1 | 1 | 1 |
| C2 | 0 | 0 | 0 | 0 | 0 | 0 | 1 | 0 | 1 | 0 | 0 | 0 | 1 | 0 | 0 | 0 |

In Table II above, the columns represent successive intervals in time delineated by successive clock cycles (T1 ... T16) during which the system operates on the four numbers D1 ... D4. The left-hand column of the Table contains a list of the respective inputs, outputs, and contents of the carry flip-flops (Ci) of each of multiplexer-adders 10, 20, 30. The left-hand column also designates a mode of operation for each multiplexer adder. The respective mode for each multiplexer adder for a particular clock cycle is listed in the column headed by that clock cycle. For the first adder encountered by an incoming data word at the lowermost tier (TIER) of the adder tree, the modes of operation for the Multiplexer-adder 20 from which the output of the adder tree is derived is initially in mode 0 but converts to mode 1 at clock cycle T3 and back to mode 0 at clock cycle T5, repeating this pattern every four clock cycles. The derived product output is produced on output S21 at all times and with sequential four bit numbers being processed, multiplexer adder 20 remains in mod 0 after clock cycles T1 and T2. During initial clock cycle T1 and T2, the carry flip-flop of multiplexer adder 20 is effectively empty, so that the adder of multiplexer 20 is effectively unused. Beginning with clock cycle T3, however, for a four bit number, and extending through clock cycle T6, the adder circuitry of multiplexer adder 20 is being used for addition. For the remaining two clock cycles T7 and T8 no addition is carried out with respect to the initial four bit number being processed. It is, however, being employed for subsequent signal processing.

An analysis of the operation of the respective adders of the adder tree reveals that for the first N/4 and last N/4 clock cycles the adder function of the adder is effectively unused. It is instead, the middle N/2 clock cycles that are employed for the addition. As an example, considering a 16 bit word, for the first 4 clock cycles T1–T4 and the last 4 clock cycles T13–T16, the adder is effectively unused. Computation is carried out only during the T5–T12 clock cycles. Similarly for an 8 bit number, the first two clock cycles and the last two clock cycles are not employed for computation by the adder. As pointed out above, in accordance with the present invention, advantage is taken of this inherent characteristic of the operation of the components of the adder tree to multiplex other numbers into the computational circuitry for processing.

The binary bit values shown in Table II correspond to the sequential clocking of the successive four bit numbers referenced above into the shift register 12, the shift register 12 initially being reset or zeroed out. At time T1, the least significant bit (0) of the first 4 bit data word D=0010 is clocked into the first stage 12-1 of adder 12. Its output is coupled over link A1 to the left-hand input of multiplexer 10. The right-hand input of multiplexer 10 or the B1 input thereof is derived from stage 12-2 which, as noted above, contains a zero. Since multiplexer adder stage 12-1 is currently in mode 2, its S11 output corresponds to the sign bit of the previous number (0) and the sum of input of B1 and the contents of the carry latch within the adder. Since each of these numbers is a 0, output S11 is also a 0. The second output S12 corresponds to the A1 input which, for the number of interest having the least significant bit equal 0, corresponds to a 0. Thus, for the initial multiplexer adder 10 of the lowermost TIER 1, all data outputs and contents equal 0. The second multiplexer adder stage 30 is also zeroed out by the fact that the shift register 12 has been zeroed out and a new word input signal has been applied to all the multiplexer adders, clearing their carry registers. Since the outputs of both multiplexers 10 and 30 are zeroes, multiplexer 20 also produces zeroes on its outputs S21 and S22.

It is to be noted in Table II that the columns adjacent the row designation S22 contain the least significant N bits of the current word, but these are normally discarded, taking the outputs of the adder tree from the S21 output (the N most significant bits).

At time T2, the next least significant bit (binary 1) of the first number of interest 0010 is clocked into the first stage 12-1 of shift register 12, while the least significant bit is shifted from the first stage 12-1 to stage 12-2. This is represented in the Table II by a one in the A1 row beneath column T2 and a zero in the B1 row beneath column T2. Proceeding across the table in successive clock cycles and down the rows through row designations A1, B1, A3, B3 reveals the manner in which the successive bit values of the four bit data words of interest being multiplied by the constant 0111 are sequenced through the successive stages 12-1, 12-2 of shift register 12.

Mathematical representations of the actual binary arithmetic that is effectively carried out by the multiplier adder tree is set forth below for each of the numbers D1 ... D4.

| | | | | $D1 = 0010 (2_{10})$ | | | | |
|---|---|---|---|---|---|---|---|---|
| T8 | T7 | T6 | T5 | T4 | T3 | T2 | LSB T1 | |
| | | | | 0 | 0 | 1 | 0 | |
| | | X | 0 | 1 | 1 | 1 | 1 | |
| | | | | 0 | 0 | 1 | 0 | |
| | | | 0 | 0 | 1 | 0 | | |
| | | 0 | 0 | 1 | 0 | | | |
| | 0 | 0 | 1 | 0 | | | | |
| 0 | 0 | 0 | 1 | 1 | 1 | 1 | 0 | |
| MSB | | | | | | | LSB | |

| | | | | $D2 = 0111 (7_{10})$ | | | | |
|---|---|---|---|---|---|---|---|---|
| T12 | T11 | T10 | T9 | T8 | T7 | T6 | LSB T5 | |
| | | | | 0 | 1 | 1 | 1 | |
| | | X | 0 | 1 | 1 | 1 | 1 | |
| | | | | 0 | 1 | 1 | 1 | |
| | | | 0 | 1 | 1 | 1 | | |
| | | 0 | 1 | 1 | 1 | | | |
| 0 | 1 | 1 | 0 | 1 | 0 | 0 | 1 | |
| MSB | | | | | | | LSB | |

| | | | | $D3 = 1100 (-4_{10})$ | | | | |
|---|---|---|---|---|---|---|---|---|
| T16 | T15 | T14 | T13 | T12 | T11 | T10 | T9 | |
| | | 1 | 1 | 1 | 1 | 0 | 0 | |
| | | X | 0 | 1 | 1 | 1 | 1 | |
| | 1 | 1 | 1 | 1 | 1 | 0 | 0 | |
| | 1 | 1 | 1 | 1 | 0 | 0 | | |
| | 1 | 1 | 1 | 0 | 0 | | | |
| | 1 | 1 | 1 | 0 | 0 | | | |
| 1 | 1 | 1 | 1 | 0 | 0 | 0 | 1 | 0 0 |
| MSB | | | | | | | LSB | |

| | | | | $D4 = 0010 (2_{10})$ | | | | |
|---|---|---|---|---|---|---|---|---|
| T20 | T19 | T18 | T17 | T16 | T15 | T14 | T13 | |
| | | | | 0 | 0 | 1 | 0 | |
| | | X | 0 | 1 | 1 | 1 | 1 | |
| | | | | 0 | 0 | 1 | 0 | |
| | | | 0 | 0 | 1 | 0 | | |
| | | 0 | 0 | 1 | 0 | | | |
| | 0 | 0 | 1 | 0 | | | | |
| 0 | 0 | 0 | 1 | 1 | 1 | 1 | 0 | |
| MSB | | | | | | | LSB | |

As can be seen from the respective multiplication processes and products for the four numbers D1, D2, D3 and D4 above, bit serial multiplication effectively corresponds to successive shifting of the contents of the number being multiplied (or all zeroes in its place if the constant contains zeroes in nonsignificant bit positions). This operation is effectively carried out by successive shifting of the input data word over the number of bits of which the constant is comprised. The columns of the mathematical representations effectively correspond to the clock cycles T1 . . . They are shown in an order reversed to that listed in Table II because the above products are listed with the least significant bit to the right, while Table II and FIG. 3 show entry of the data word with the least significant bit to the left and the most significant bit to the right. Thus, in the row headed by designation S21 in Table II, the most significant bit is to the right, while the least significant bit is to the left.

From an examination of clock cycles T5–T8 in Table II, it can be seen that the product of the initial number D1=0010 by the constant 01111 is represented by the four bit value 0001, namely the foremost significant bits of the 8 bit resultant product mathematically illustrated above beneath the number D1=0010 ($2_{10}$). At the completion of the next four clock cycles T9–T12, the product of the number D2=0111 ($7_{10}$) and the constant (01111) namely its uppermost four significant bits 0110, is produced. Clock cycles T13–T16 produce the four most significant bits of the product of the constant (01111) and the input number D3=1100 ($-4_{10}$). Table II does not show clock cycles T17 . . . T20 in order to simplify the listing. It does show, however, the sequencing of number D4 into the stages 12-1 . . . 12-4 of the shift register in the same manner as shown for clock cycles T1 . . . T4.

As will be appreciated from foregoing description of the multiplexer-adder configuration shown in FIG. 5 and the mode of operation definitions and sequencing of data bits from Tables I and II, by controllably multiplexing the respective bits of the data words as they are clocked through the data shift register through an add operation or bypassing that add operation, the throughput of the system can be increased by effectively doubling the signal processing rate. Since the adder function of each adder is effectively used only half the time, the remaining clock cycles can be employed for adding other data words.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in a data processing apparatus wherein respective sequences of digital data codes representative of numerical values are subjected to at least one prescribed arithmetic signal processing operation, an arrangement for producing an output representative of the respective products of the numerical values represented by a sequence of digital data codes and a prescribed numerical value, said arrangement comprising:
   first means, having a plurality of sequential storage locations, for sequentially receiving and shifting therethrough respective successive portions of a digital data code;
   a plurality of multiplexer-adder means arranged in a tiered, tree-like configuration, each multiplexer adder means having a plurality of inputs and a plurality of outputs and including an adder circuit for providing at a selected one of said outputs the sum of data values coupled to selected ones of said plurality of inputs, and signal coupling means for coupling one of said plurality of inputs other than said selected ones of said plurality of inputs to an output other than said selected one of said outputs; and
   second means for coupling selected storage locations of said first means to inputs of selected ones of said multiplexer-adder means, and for selectively coupling outputs of said multiplexer-adder means to inputs of selected others of said multiplexer-adder means.

2. An arrangement according to claim 1, wherein said second means includes means for selectively coupling a respective storage location of said first means to inputs of ones of said multiplexer-adder mean in accordance with the contents of said prescribed numerical value.

3. An arrangement according to claim 2, wherein said plurality of sequential storage locations of said first means comprises first through $M^{th}$ sequentially arranged storage locations through which successive portions of a digital data code are sequentially shifted, and wherein said tiered, tree-like configuration of said plurality of multiplexer-adder means includes a first multiplexer-adder means of a first tier thereof having a first input coupled to said first storage location of said first means and a plurality of outputs coupled to a plurality of inputs of a multiplexer-adder means of a second tier of said plurality of multiplexer-adder means.

4. An arrangement according to claim 3, wherein said plurality of multiplexer adder means is configured of $K = \log_2 M$ tiers, and wherein the output representative of said product is derived from one of the plurality of outputs of a multiplexer-adder means of the $K^{th}$ tier.

5. An arrangement according to claim 4, wherein said second means includes means for controllably coupling selected inputs of each multiplexer-adder means to the adder circuit thereof and a selected input to a selected output thereof, such that for any digital data code received by shifted through the sequential storage locations of said first means, said adder circuits are engaged to operate on the contents of said digital code for one-half the number of shifts required to shift said code into and through said first means.

6. An arrangement according to claim 5, wherein said second means includes means for controlling the operation of said multiplexer-adder means such that a respective product is represented by a product code, the length of the product code corresponds to the code length of the digital code shifted through the sequential storage locations of said first means.

7. An arrangement according to claim 6, wherein the length of said product code produced by the output of said arrangement corresponds to the N most significant bits of said product code, where N is the bit length of said digital data code and M is the bit length of a prescribed digital code representative of said prescribed numerical value and $N \geq M$.

8. An arrangement according to claim 1, wherein said second means includes means for controllably coupling selected inputs of each multiplexer-adder mean to the adder circuit thereof and a selected input to a selected output thereof, such that for any digital data code received by shifting through the sequential storage locations of said first means, said adder circuits, are engaged to operate on the contents of said digital data code for one-half the number of shifts required to shift said digital data code into and through said first means.

9. An arrangement according to claim 8, wherein said second means includes means for controlling the operation of said multiplexer-adder means such that a respective product is represented by a product code, the length of the product code corresponds to the code length of the digital data code shifted through the sequential storage locations of said first means.

10. An arrangement according to claim 9, wherein the length of said product code produced by the output of said arrangement corresponds to the N most significant bits of said product code, where N is the bit length of said digital data code and M is the bit length of a prescribed digital code representative of said prescribed numerical value and $N \geq M$.

11. A bit serial multiplier for generating a bit-serial digital output code representative of the product of a predescribed digital code having a prescribed numerical value and an input digital code coupled to said multiplier in a bit serial manner, said bit serial multiplier comprising:

sequential storage means having a plurality of sequential storage locations into and through which said input digital code is shifted in a bit serial manner;

a multi-tiered tree-like arrangement of a plurality of multiplexer-adder means, each having first and second pairs of inputs and a pair of outputs and including an adder circuit for providing, at a selected output of said pair of outputs, the sum of data bit applied to a selected pair of said inputs, and signal coupling means for coupling one of the inputs of said first and second pairs of inputs to the other of said pair of outputs;

signal coupling control means for coupling selected ones of said sequential storage locations to selected inputs of selected ones of said multiplexer-adder means and for selectively coupling the outputs of plural ones of said multiplexer-adder means to selected inputs of at least one selected other of said multiplexer-adder means; and output means, coupled to a selected output of a selected one of said multiplexer-adder means, for deriving said bit-serial digital output code.

12. A bit serial multiplier according to claim 11, including means for coupling the output pairs of each of said multiplexer-adder means, other than said selected one of said multiplexer-adder means, to one of the first and second pairs of inputs of other multiplexer adder means of said plurality of multiplexer-adder means.

13. A bit serial multiplier according to claim 12, wherein said signal coupling control means includes means for controllably coupling selected inputs of each multiplexer adder means to the adder circuit thereof and a selected input to a selected output thereof such that for any digital code value received by and shifted through the sequential storage locations of said sequential storage means, said adder circuits are coupled to operate on the contents of said digital code for one-half the number of bits required to shift said digital code into and through the sequential storage locations of said sequential storage means.

14. A bit serial multiplier according to claim 11, wherein said signal coupling control means includes means for controlling the operating of said multiplexer-adder means such that said bit-serial digital output code corresponds to the most significant N bits of the product of said prescribed digital code of length M and said input digital code of length N, where $N \geq M$.

15. A bit serial multiplier according to claim 14, wherein said plurality of multiplexer adder means is arranged in $K = \log_2 M$ tiers, and said bit serial digital output code is derived from one of the outputs of a multiplexer-adder means of the $K^{th}$ tier.

16. A bit serial multiplier according to claim 15, said second means including means for coupling the output pairs of each of said multiplexer-adder means, other than said selected one of said multiplexer-adder means, to one of the first and second pairs of inputs of other multiplexer-adder means of said plurality of multiplexer-adder means.

17. A bit serial multiplier according to claim 16, wherein said signal coupling control means includes means for controllably coupling selected inputs of each multiplexer adder means to the adder circuit thereof and a selected input to a selected output thereof such that for any digital code value received by and shifted through the sequential storage locations of said sequential storage means, said adder circuits are coupled to operate on the contents of said digital code for one-half the number of bits required to shift said digital code into and through the sequential storage locations of said sequential storage means.

18. For use with a bit-serial digital multiplier having a multi-stage input data register and a multitiered tree of adder circuits coupled thereto which produces, at the output of the adder at the top tier of the tree, successive bit serial digital output codes representative of the products of a prescribed digital data code and successive input data codes as said input data codes are sequentially shifted into and through said input data register, a method of operating said bit-serial digital multiplier so that said successive output codes are generated at twice the rate required to shift respective input data codes into and through said input data register, thereby increasing the effective computational speed of said multiplier, said method comprising the steps of controllably coupling the contents of selected stages of said input data register to selected adders of said adder tree, intercoupling selected ones of the adders between successive tiers of said adder tree, and effectively bypassing selected others of the adders between successive tiers of said adder tree, for each computational cycle of said adder tree, as said input data code is shifted therethrough.

19. A method according to claim 18, wherein, for each input data code, the controllably coupling, intercoupling and bypassing of the adders of said tree is carried out in dependence upon the location of said each input data code within the stages of said input data register.

20. A method according to claim 19, wherein the bits of said bit-serial digital output code correspond to the most significant N bits of the product of said prescribed digital data code of length M and said input digital data code of length N, where $N \geq M$.

* * * * *

UNITED STATES PATENT AND TRADEMARK OFFICE
CERTIFICATE OF CORRECTION

PATENT NO. : 4,839,847

DATED : June 13, 1989

INVENTOR(S) : Kenneth C. Laprade

It is certified that error appears in the above-identified patent and that said Letters Patent is hereby corrected as shown below:

Column 1, between lines 3 and 5, the following paragraph should be inserted.

-- The United States Government has rights in the present patent under U.S. Government Contract.--

Signed and Sealed this

Twenty-fourth Day of July, 1990

Attest:

HARRY F. MANBECK, JR.

*Attesting Officer*  *Commissioner of Patents and Trademarks*